United States Patent
Zhu et al.

(10) Patent No.: US 8,651,015 B2
(45) Date of Patent: Feb. 18, 2014

(54) ELECTRONIC STERILIZATION DEVICE AND METHOD

(75) Inventors: Yixin Zhu, Hangzhou (CN); Tingting Lu, Hangzhou (CN)

(73) Assignee: Zhejiang Haochuang Biotech Co., Inc., Hangzhou (CN)

( * ) Notice: Subject to any disclaimer, the term of this patent is extended or adjusted under 35 U.S.C. 154(b) by 123 days.

(21) Appl. No.: 13/214,170

(22) Filed: Aug. 20, 2011

(65) Prior Publication Data

US 2011/0297011 A1    Dec. 8, 2011

(51) Int. Cl.
  *A23L 3/00*    (2006.01)
  *A23C 3/07*    (2006.01)
  *A47J 37/06*   (2006.01)

(52) U.S. Cl.
  USPC ............. 99/358; 99/451; 99/483; 426/238; 426/237; 422/22

(58) Field of Classification Search
  USPC .......... 99/451, 358, 483; 422/22, 23, 186.04; 426/238, 237
  See application file for complete search history.

(56) References Cited

U.S. PATENT DOCUMENTS

| | | | | |
|---|---|---|---|---|
| 2,510,796 | A | * | 6/1950 | Brown ............................ 99/451 |
| 5,447,733 | A | * | 9/1995 | Bushnell et al. ............... 426/237 |
| 5,690,978 | A | * | 11/1997 | Yin et al. ....................... 426/237 |
| 6,086,932 | A | * | 7/2000 | Gupta ............................ 426/237 |
| 6,178,880 | B1 | * | 1/2001 | Mastwijk et al. ............... 99/451 |
| 6,393,975 | B2 | * | 5/2002 | Morshuis et al. ............... 99/451 |

* cited by examiner

*Primary Examiner* — Reginald L Alexander
(74) *Attorney, Agent, or Firm* — BainwoodHuang

(57) ABSTRACT

This invention relates to a processing machine of the food industry, specifically, a new electronic sterilization device for liquid beverage or liquids. One pole of the electric voltage device is connected to the voltage connector sleeve with an outlet of hollow capillary emitter, and the other pole of the electric voltage device is connected to the collection container. The inner diameter of the exit end of the hollow capillary emitter is very small. Liquid forms a Taylor cone at the exit end under the electric field force, thus a high electric field area is formed on the surface of the Taylor cone. Bacteria passing through the high electric field area will be fully polarized, thoroughly disrupted or electroporated, and finally killed. This invention features simple structure and easy operation with better and more thorough sterilization effect, showing distinct technical advantages especially for substances inappropriate to be treated in high temperature, high pressure or strong electric field, and its wide use in food and beverage industry can be expected in the very near future.

16 Claims, 3 Drawing Sheets

Overall Structure of the electric spraying sterilization device

FIG. 1: Overall Structure of the electric spraying sterilization device

FIG. 2: Various Shapes of the hollow capillary emitter

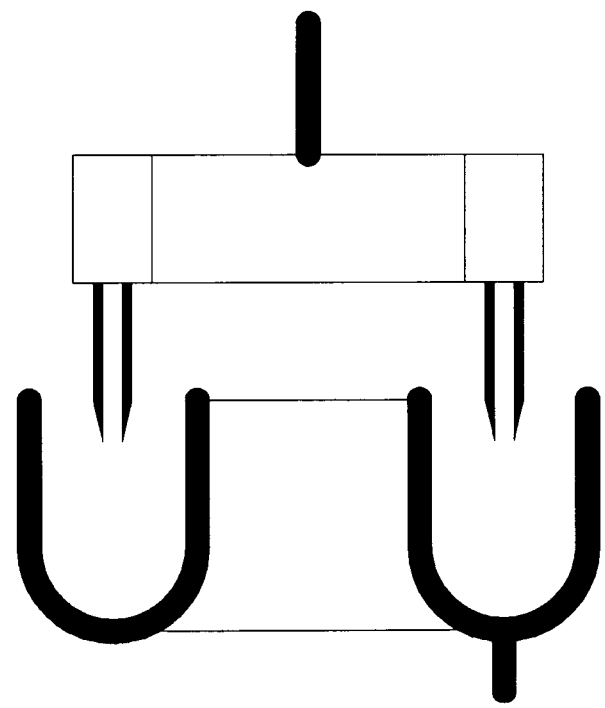
FIG. 3A: Circular Array structure for hollow capillary emitter
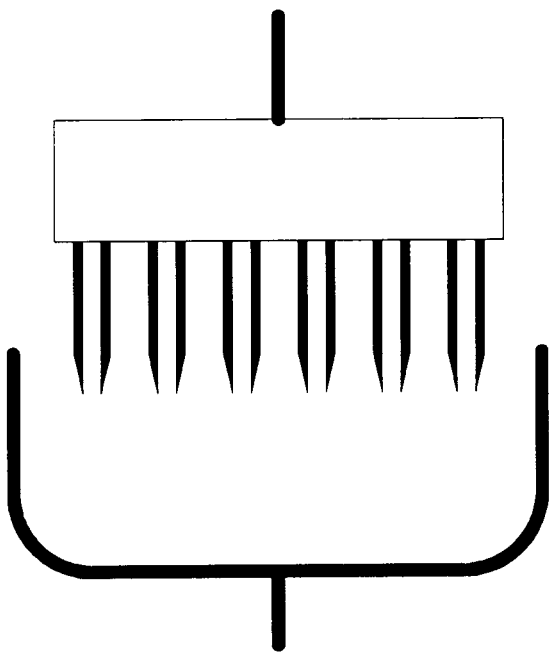
FIG. 3B: Plane Array structure for hollow capillary emitter

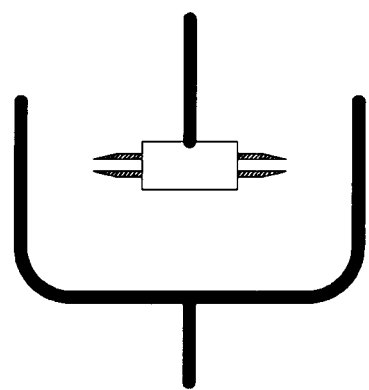
FIG. 3C: Radial Array structure for hollow capillary emitter

ELECTRONIC STERILIZATION DEVICE AND METHOD

BACKGROUND OF THE INVENTION

1. Field of the Invention

This invention relates to a processing machine in food industry, specifically, a new sterilizing device for liquid beverage or liquids.

2. Description of the Related Art

High intensity pulsed electric field (PEF) technology is used for enzyme-inactivating and sterilizing in food industry based on cellular structure and differences in electric properties within liquid food systems. When liquid food is placed in electric field as an electric medium, the cell membrane of microorganism in food is electrically broken down by strong electric field action, thus causing irreversible membrane electroporation or disruption, damaged cell tissues, and consequently microbial inactivation. It has been proved that food can be sterilized effectively under conditions of pulsed electric field at 12-40 Kv/cm (kilo volts per centimeter) and pulse duration of 20 μs-18 μs (micro-seconds), with square wave pulse waveform being the most effective. Scientists have made a lot of researches on PEF sterilization and applied for many patents, such as CN2004201123797, CN011300647, CN2009100954911, CN2009100954907 and CN2009100213384.

However, all technical solutions of the aforementioned patents impose high pulsed electric voltage in liquid to form high intensity pulsed electric field, so that bacteria contained in liquid are electroporated and consequently inactivated when exposed to a high intensity pulsed electric field. This kind of technical solution requires high intensity pulsed electric voltage firstly, so inevitably brings about high energy consumption, high technical requirements for equipment and definitely with some risk factors. Most of all, the pulsed electric field theory fails to ensure a same PEF intensity for liquids of diverse physical and chemical parameters which may present at any time for beverage product line, thus causing instability of sterilizing effect.

Under the same electric voltage, changes of physical parameters of the liquid, such as electric conductivity and dielectric constant, would substantially affect electric field intensity in the liquid, thus affecting sterilizing effect. To date, most of PEF sterilizing researches fail to address this important issue, which prevents the application of PEF sterilizing technology in actual beverage lines.

SUMMARY OF THE INVENTION

An object of the present invention is to overcome at least some of the drawbacks relating to the prior arts as mentioned above.

For the problems as set forth above, this invention discloses a device of high efficiency, reasonable design and simple structure.

The concept of this invention differs from the electric field theory of the aforementioned patented arts: the sterilizing theory of existing technologies is realized via a stable strong electric field whose intensity is irrelevant to physical and chemical parameters of the liquid, and the strong electric field directly breaks down microorganisms such as bacteria, leading to their death; while the electric voltage device in the present invention mainly acts as an electrical source, so that when liquid carrying bacteria flows through the voltage connector sleeve, liquid conducts high voltage to the outlet of the hollow capillary emitter, and bacteria are gradually polarized for their own electric and chemical properties. Generally, electric current will not cause bacteria killed directly in the voltage connector sleeve and also this is not the main technical point and technical concept of the present invention. In the present invention, bacteria with molecular polarity flow with liquid, as the outlet of the hollow capillary emitter is filled with liquid, liquid will thus form a dynamic Taylor cone under the electric field force. The radius of curvature is small enough to be counted on sub-micron level so that the surface electric field action on liquid is strong enough to fully polarize the microbial cells with polarity and thoroughly disrupt them to achieve the effect of sterilizing.

The present invention is realized through the following technical scheme and implementation:

A new electronic sterilization device includes an electric voltage device and a voltage connector sleeve, wherein the anode or cathode of the electric voltage device connects with voltage connector sleeve (made of conducting material) via a cable, while the other pole connects with collection container (with metal inner wall or wholly of metal). The outlet of the voltage connector sleeve is the hollow capillary emitter whose outlet is connected to the collection container. $Onl_2$ if the voltage connector sleeve is made of conducting material, such as iron, copper, stainless steel, metal alloy, etc., can the electricity of electric voltage device be transmitted to the liquid in voltage connector sleeve. The electric voltage device sends pulsed voltage, random pulsed voltage, one-way sine wave voltage, one-way non-sinusoidal wave voltage or DC (direct current) voltage, with voltage value at 10V (volt)~100 KV (kilo volts) and a control device on its connection. Since the voltage hereof has a wide range in use, theoretically, as long as voltage make the bacteria electrified and polarized, sterilizing can be realized consequently.

Preferably, the voltage value of the electric voltage device in this electric spraying sterilization device is 10V~100 KV. Its control device is an intelligent one which may choose various voltage functions depending on liquid flow, bacteria concentration and physical and chemical parameters of liquid. The voltage functions will neither bring any impact on the application of the present invention from its sterilizing theory nor any impacts on achieving sterilizing effect, but only to make the device work better depending on physical and chemical parameters of liquid.

In view of actual voltage in use, the voltage value of the electric voltage device in the aforementioned electric spraying sterilization device is 800V~20,000V (volts), and good sterilizing effect can be achieved without additional device.

Preferably, the inlet of the voltage connector sleeve in the aforementioned electric spraying sterilization device is connected to an input pipe and feed pump, and both of which are designed for better realization of the overall sterilizing operation but they are only conventional parts determined upon specific process requirements.

Preferably, the inner diameter of the exit end of the hollow capillary emitter in the aforementioned electric spraying sterilization device is less than 10 mm (millimeter). Liquid will form a dynamic Taylor cone at the exit end under electric field force and a high electric field area will be formed on the surface of the Taylor cone. Bacteria passing through this high electric field area will be fully polarized, thoroughly disrupted or electroporated, and finally killed. This Taylor cone is a known and matured technique in the electric spray ionization industry. Another innovative point for the present invention is shifting the Taylor cone technique used in the electric spray ionization industry to the liquid food sterilization field. Benefits from it are beyond expectations, including effects on preserving the nutritional components of the food, especially for foods unsuitable for high temperature or high pressure treatment. The electric field force of the aforementioned exit end in the present invention is caused by the electric field between the Taylor cone formed by liquid at the outlet of the hollow capillary emitter, and the collection container.

As a better choice, the hollow capillary emitter is composed of the main body and the exit end. The main body is in cylinder form, and the exit end is cone-shaped. The bottom of cone is connected to the cylinder, and the inner diameter of the cone top is 10 microns-5 mm (millimeter). The cylinder and the cone are interpenetrated via a through hole. The structural design offers thinner exit end for the hollow capillary emitter to facilitate a stable Taylor cone. Certainly, hollow capillary emitter with square, oblong, oval cross sections, but not limited thereto, can also realize the objective of the present invention provided with small enough exit end.

Preferably, the exit end for the hollow capillary emitter in the aforementioned electric spraying sterilization device is connected to the collection container which further connects with the discharge pump by the discharge pipe. The inside surface of the collection container is made of metal material, connecting with grounding wire or the cathode of voltage device.

The present invention features simple structure and easy operation with better and more thorough sterilization effect, showing distinct technical advantages especially for substances inappropriate to be treated in high temperature, high pressure or strong electric field.

All these and other introductions of the present invention will become much clear when the drawings as well as the detailed descriptions are taken into consideration.

BRIEF DESCRIPTION OF THE DRAWINGS

For the full understanding of the nature of the present invention, reference should be made to the following detailed descriptions with the accompanying drawings in which:

FIG. 1 shows the structural diagram of the present invention.

FIG. 2 describes Various Shapes of the hollow capillary emitter.

FIG. 3 discloses the improved structure between hollow capillary emitter and collection container.

Like reference numerals refer to like parts throughout the several views of the drawings.

DESCRIPTION OF THE PREFERRED EMBODIMENT

The present invention will be described more fully hereinafter with reference to the accompanying drawings, in which some examples of the embodiments of the present invention are shown. Indeed, the present invention may be embodied in many different forms and should not be construed as limitation to the embodiments set forth herein, rather, these embodiments are provided by way of example so that this disclosure will satisfy applicable legal requirements. Like numbers refer to like elements throughout.

The following specification for the implementation of the present invention is made based on the attached drawings.

The operation and implementation of the present invention will be disclosed in details as follows:

In line with the structure shown in FIG. 1, A new electronic sterilization device comprises electric voltage device (100), voltage connector sleeve (50), and the anode of the electric voltage device (100) through cable (40) is connected to the voltage connector sleeve (50) made of metal iron whose outlet is the hollow capillary emitter (60). Voltage of the electric voltage device (100) is pulsed voltage at 100V, and the inlet of the voltage connector sleeve (50) is connected to input pipe (20) and feed pump (30). The exit end width of the hollow capillary emitter (60) is 10 mm (millimeter), and the exit end of the hollow capillary emitter (60) is connected to the collection container (70) which is connected to the discharge pump (80) via the discharge pipe (90), and the collection container (70) is connected to the ground through metal wire.

As the voltage connector sleeve (50) is connected to the electric voltage device (100) with 100V voltage, when bacteria-containing liquid passes through the voltage connector sleeve (50) via the feed pump (30), the bacteria contained will be electrified after flowing through the voltage connector sleeve (50), and further form a Taylor cone, with the liquid, at the exit end under the electric field force, thus a high electric field area is formed on the surface of the Taylor cone. Bacteria passing through this high electric field area will be fully polarized and thoroughly disrupted and consequently killed. Liquid flows out through the exit end of the hollow capillary emitter (60), enters the collection container (70), goes through the operation of the discharge pump (80) and is discharged through the discharge pipe (90).

In order to increase the processing flow for the aforementioned liquid, the structure between the hollow capillary emitter and the collection container, as set forth above, can be improved in many ways. The improved structure for hollow capillary emitter includes Circular Array structure (as shown in FIG. 3A), Plane Array structure (as shown in FIG. 3B) and Radial Array structure (as shown in FIG. 3C).

Furthermore, the aforementioned hollow capillary emitter can be in different shapes as shown in FIG. 2.

After repeated observations and tests, it is discovered that the discharged liquid no longer contains bacteria. Comparing to the pre-treatment, the post-treatment effects with the present invention are remarkable.

In summary, the present invention contains the following main features:

A new electronic sterilization device comprises an electric voltage device and a voltage connector sleeve, wherein an anode or cathode of the aforementioned electric voltage device is connected to the aforementioned voltage connector sleeve through a cable, and the other pole of the aforementioned electric voltage device is connected to a collection container, the outlet of the aforementioned voltage connector sleeve is a hollow capillary emitter, the aforementioned voltage connector sleeve is made of conducting material, and the aforementioned collection container or its inner wall is made of metal material and the exit end of the aforementioned hollow capillary emitter is connected to the aforementioned collection container.

The aforementioned voltage of the aforementioned electric voltage device is pulsed voltage, random pulsed voltage, one-way sine wave voltage, one-way non-sinusoidal voltage or DC (direct current) voltage, with voltage value at 10V (volts) ~100 KV (kilovolts) and the aforementioned electric voltage device has a control device on its connection.

The aforementioned voltage value of the aforementioned electric voltage device is 10V (volts)~100 KV (kilovolts) and the aforementioned control device is an intelligent control device.

The aforementioned voltage value of the aforementioned electric voltage device is 800V~20,000V (volts).

An inlet of the aforementioned voltage connector sleeve is connected to an input pipe and a feed pump.

The inner diameter of exit end of the aforementioned hollow capillary emitter is less than 10 mm (millimeter).

The aforementioned hollow capillary emitter is composed of a main body and an exit end, and the aforementioned main body is a cylinder, the aforementioned exit end is cone-shaped with the bottom connected to the aforementioned cylinder, and the inner diameter of the aforementioned cone top is 10 microns-5 mm, wherein the aforementioned cylinder and the aforementioned cone are interpenetrated via a through hole.

The aforementioned exit end for the aforementioned hollow capillary emitter is connected to the aforementioned collection container which is connected to a discharge pump through a discharge pipe, and the inner wall of the aforementioned collection container is made of metal material and is connected to a grounding wire.

When bacteria-containing liquid passes through the aforementioned voltage connector sleeve via the aforementioned feed pump, the aforementioned bacteria will be electrified after flowing through the aforementioned voltage connector sleeve, and further form a taylor cone with the aforementioned liquid at the aforementioned exit end under electric field force, thus a high electric field area is formed on the surface of the aforementioned taylor cone, and the aforementioned bacteria passing through the aforementioned high electric field area will be fully polarized and thoroughly disrupted and consequently killed.

The aforementioned liquid flows out through the aforementioned exit end of the aforementioned hollow capillary emitter (60), enters the aforementioned collection container (70), goes through operation of the aforementioned discharge pump (80) and is discharged through the aforementioned discharge pipe.

The aforementioned hollow capillary emitter can be in different shapes.

The aforementioned hollow capillary emitters can be in different structures including circular array structure, plane array structure and radial array structure, to increase processing flow for liquids and optimize performance between the aforementioned hollow capillary emitter and the aforementioned collection container.

The above specification and claims, as well as the ideas and logic process, specific operation and implementation concept constitute the core of this patent and the overall scope of claims.

The system and method of the present invention are not meant to be limited to the aforementioned experiment, and the subsequent specific description utilization and explanation of certain characteristics previously recited as being characteristics of this experiment are not intended to be limited to such techniques.

Many modifications and other embodiments of the present invention set forth herein will come to mind to one ordinary skilled in the art to which the present invention pertains having the benefit of the teachings presented in the foregoing descriptions. Therefore, it is to be understood that the present invention is not to be limited to the specific examples of the embodiments disclosed and that modifications, variations, changes and other embodiments are intended to be included within the scope of the appended claims. Although specific terms are employed herein, they are used in a generic and descriptive sense only and not for purposes of limitation.

What is claimed:

1. An electronic sterilization system, said system comprising an electric voltage device and a voltage connector sleeve, wherein an anode or cathode of said electric voltage device is connected to said voltage connector sleeve through a cable, and the other pole of said electric voltage device is connected to a collection container, the outlet of said voltage connector sleeve is a hollow capillary emitter, said voltage connector sleeve is made of conducting material, and said collection container or its inner wall is made of metal material and the exit end of said hollow capillary emitter is connected to said collection container, wherein, when bacteria-containing liquid passes through said voltage connector sleeve, said bacteria will be electrified after flowing through said voltage connector sleeve, and further form a taylor cone with said liquid at said exit end under electric field force, thus a high electric field area is formed on the surface of said taylor cone, and said bacteria passing through said high electric field area will be fully polarized and thoroughly disrupted and consequently killed.

2. The system as recited in claim 1, wherein said voltage of said electric voltage device is pulsed voltage, random pulsed voltage, one-way sine wave voltage, one-way nonsinusoidal voltage or DC (direct current) voltage, with voltage value at 10V (volts)~100 KV (kilovolts) and said electric voltage device has a control device on its connection.

3. The system as recited in claim 2, wherein said voltage value of said electric voltage device is 10V (volts)~100 KV (kilovolts) and said control device is an intelligent control device.

4. The system as recited in claim 3, wherein said voltage value of said electric voltage device is 800V~20,000V (volts).

5. The system as recited in claim 1, wherein an inlet of said voltage connector sleeve is connected to an input pipe and a feed pump.

6. The system as recited in claim 1, wherein the inner diameter of exit end of said hollow capillary emitter is less than 10 mm (millimeter).

7. The system as recited in claim 6, wherein said hollow capillary emitter is composed of a main body and an exit end, and said main body is a cylinder, said exit end is cone-shaped with the bottom connected to said cylinder, and the inner diameter of said cone top is 10 microns-5 mm (millimeter), wherein said cylinder and said cone are interpenetrated via a through hole.

8. The system as recited in claim 1, wherein said exit end for said hollow capillary emitter is connected to said collection container which is connected to a discharge pump through a discharge pipe, and the inner wall of said collection container is made of metal material and is connected to a grounding wire.

9. The system as recited in claim 1, wherein said liquid flows out through said exit end of said hollow capillary emitter, enters said collection container, goes through operation of a discharge pump and is discharged through said discharge pipe.

10. The system as recited in claim 1, wherein said exit end of said hollow capillary emitter has a flat shape.

11. The system as recited in claim 1, wherein said hollow capillary emitters take the form of one of (i) a circular array structure, (ii) a plane array structure and (iii) a radial array structure, to increase processing flow for liquids and optimize performance between said hollow capillary emitter and said collection container.

12. An electronic sterilization system, said system comprising an electric voltage device and a voltage connector sleeve, wherein a first terminal of said electric voltage device is coupled to said voltage connector sleeve through a cable to charge the voltage connector sleeve to a first voltage, and a second terminal of said electric voltage device is connected to a collection container to charge the collection container to a second voltage, wherein the outlet of said voltage connector sleeve is a hollow capillary emitter, said voltage connector sleeve is made of conducting material, said collection container or its inner wall is made of metal material, and an exit end of said hollow capillary emitter is connected to said collection container and configured to spray liquid at the first voltage into the collection container at the second voltage.

13. The system as recited in claim 12, wherein, when bacteria-containing liquid passes through said voltage connector sleeve, said bacteria will be electrified after flowing through said voltage connector sleeve, and further form a Taylor cone with said liquid at said exit end under electric field force, thus a high electric field area is formed on the surface of said Taylor cone, and said bacteria passing through said high electric field area will be fully polarized and thoroughly disrupted and consequently killed.

14. The system as recited in claim 12, wherein said hollow capillary emitter is composed of a main body and an exit end, and said main body is a cylinder, said exit end is cone-shaped with the bottom connected to said cylinder, and the inner diameter of said cone top is 10 microns-5 mm (millimeter), wherein said cylinder and said cone are interpenetrated via a through hole.

15. A method for sterilizing liquids using the system of claim 12, the method comprising:

conveying a liquid through said cable into said voltage connector sleeve;

charging the liquid to the first voltage; and spraying the liquid at the first voltage from said hollow capillary emitter into the collection container at the second voltage.

16. The method as recited in claim 15, wherein the liquid includes bacteria and wherein the method further comprises:

electrifying the liquid as the liquid passes through the voltage connector sleeve;

forming a Taylor cone at said exit end under electric field force, thereby forming a high electric field area on a surface of said taylor cone; and polarizing and killing said bacteria as a consequence of passing the liquid through said high electric field area.

\* \* \* \* \*